May 22, 1962 D. M. SUTHERLAND ETAL 3,035,994
FUEL LOADING DEVICE FOR A NUCLEAR REACTOR
Filed Dec. 3, 1957 6 Sheets-Sheet 4
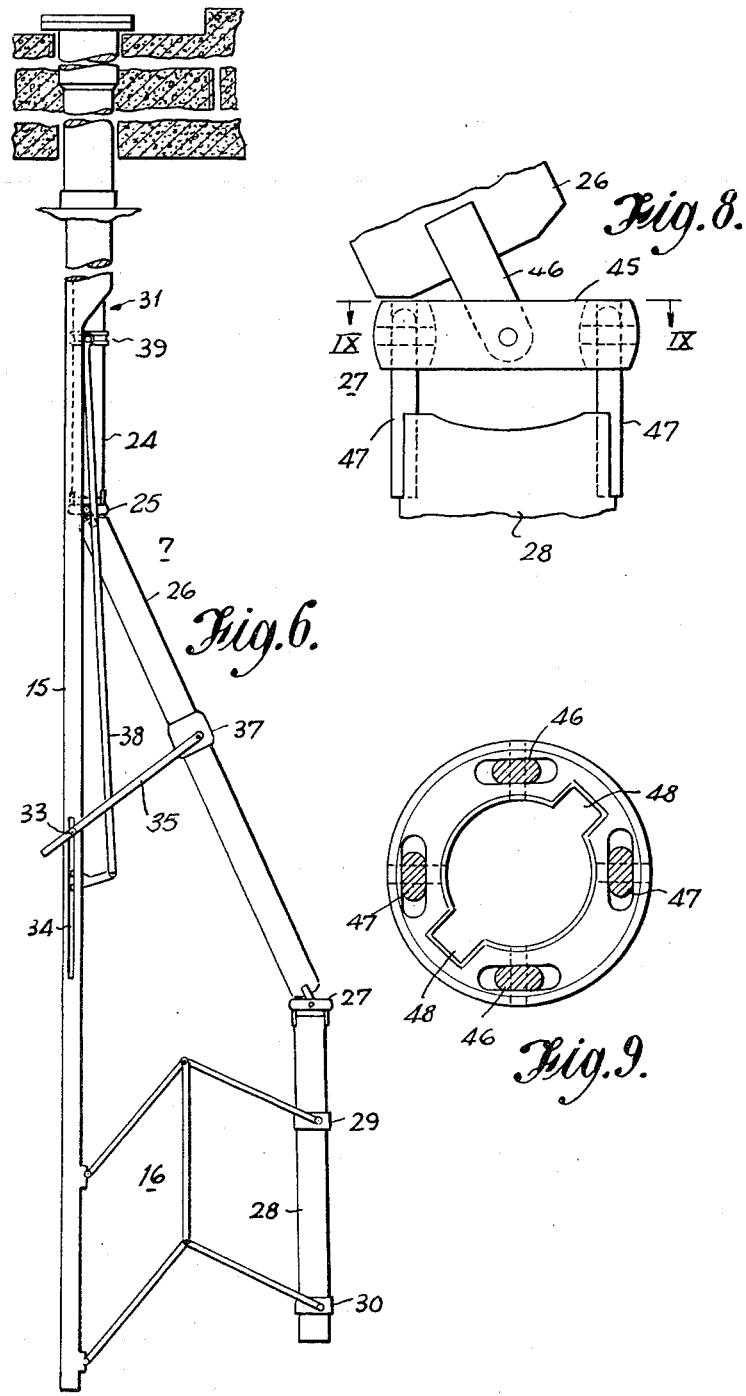

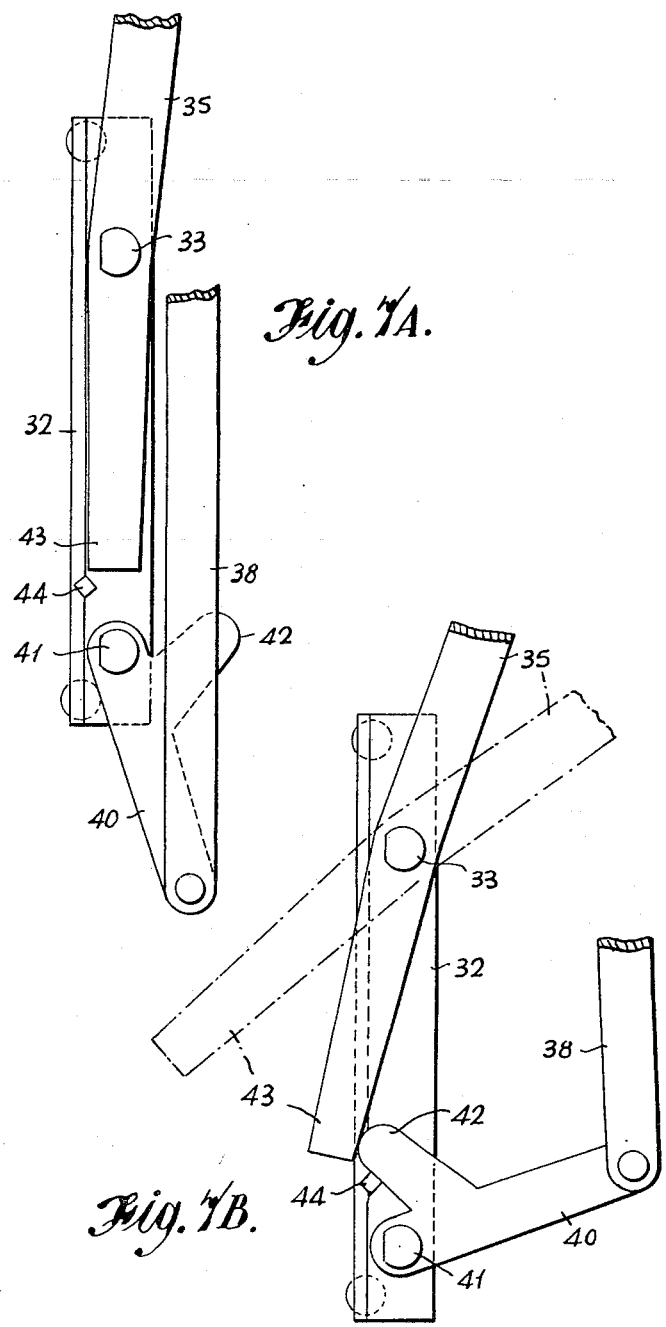

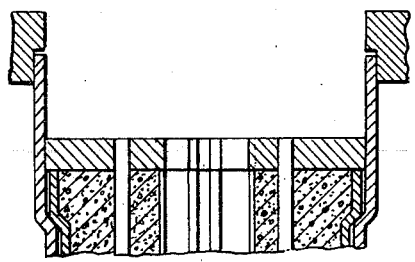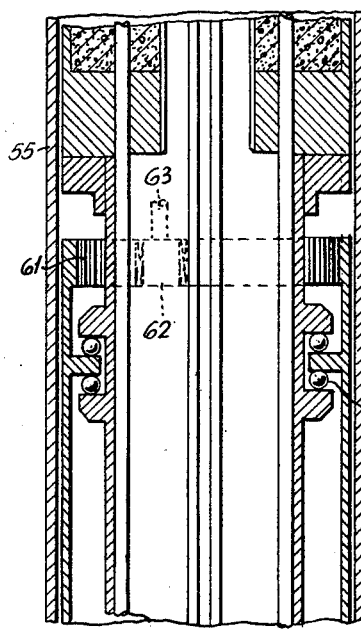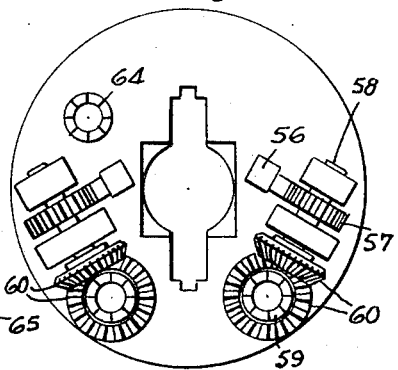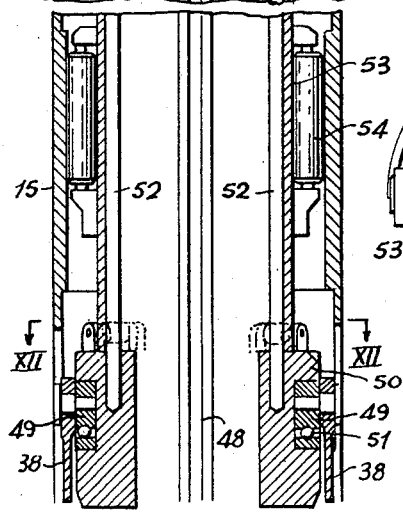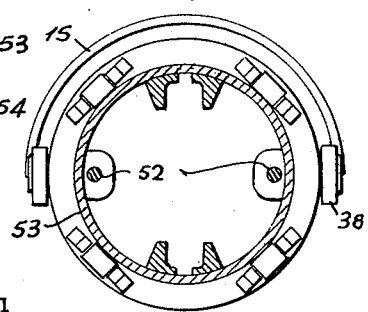

United States Patent Office 3,035,994
Patented May 22, 1962

3,035,994
FUEL LOADING DEVICE FOR A
NUCLEAR REACTOR
Donald Mason Sutherland, Urmston, Manchester, and Philip Rawson Tipper, Burnage, Manchester, England, assignors to A.E.I.-John Thompson Nuclear Energy Company Limited, London, England, a British company
Filed Dec. 3, 1957, Ser. No. 700,481
Claims priority, application Great Britain Dec. 3, 1956
2 Claims. (Cl. 204—193.2)

This invention relates to nuclear reactors.

The invention has an important application in nuclear reactors of the kind having a solid moderator, e.g. graphite, with fuel elements and control rods located in separate vertical passages in the moderator.

The invention is concerned with equipment for loading and unloading the fuel elements into and out of the fuel passages. The fuel elements in such reactors are usually in the form of rods, a number of which are placed end to end in each fuel passage.

In reactors with which the invention is concerned, the control rods are arranged in plan view in a rectangular matrix uniformly spaced apart and the fuel passages are also arranged in a rectangular matrix, but with closer spacing so that a number of fuel passages are arranged between adjacent control rods.

It follows, therefore, that the loading and unloading apparatus must be so arranged that in operation it does not foul the control rods.

According to the present invention loading and unloading equipment for a nuclear reactor of the kind having a solid moderator with fuel elements and control rods located in separate vertical passages in the moderator comprises vertical charging passages extending downwardly from the charging floor above the reactor core, and in which the charging passages are positioned above the top surface of the reactor core at the centres of unit areas of substantially cruciform outline (or part cruciform outline around the periphery) each such cruciform area having a control rod at each internal and external corner but no control rods within the area in question, together with a charging chute (or chutes) adapted to be lowered through the charging passages and so constructed that after passing down a charging passage the lower end of the chute can be displaced horizontally over the core upper surface and thereby selectively positioned and aligned with any of the core fuel passages within the cruciform area associated with the charging passage in question.

Preferably, the chute is in the form of a pipe having a radially displaceable lower end connected to a central upper member through a parallel linkage in such a manner that when displaced the lower end always remains vertical and thus a fuel element passing from the chute into a fuel passage does not have to pass around a corner.

The invention is particularly applicable to apparatus in which the fuel elements are carried in support which run in guides both down the chute and whilst in the fuel passages so that the fuel elements themselves are relieved from stresses. In such a case it is important that the orientation of the chute remains constant for all positions of the displaceable lower end to ensure that the guides in the chute will always align with the guides in the fuel channels. With this end in view the lower end of the chute is connected with an upper section by way of an intermediate section connected with the upper section and the displaceable lower section respectively through universal joints and an outer tubular member partially encircles the lower end of the chute and is provided with a vertical gap permitting outward movement of the lower end of the chute only through the gap. By rotation of the outer member the direction in which the chute is radially displaced may be selected.

In order to that the invention may be more clearly understood reference will now be made to the accompanying drawings, in which:

FIG. 6 is a detailed elevational view of the chute showing the displacement linkage.

FIG. 7A shows a detail of the displacing mechanism in the collapsed position, and FIG. 7B is a corresponding view in the partially expanded position.

FIG. 8 is a detailed view of one of the universal joints employed in the chute.

FIG. 9 is a plan view on the line IX—IX of FIG. 8.

FIG. 10 is a vertical sectional view showing how the setting of the chute is controlled from the upper end thereof.

FIG. 11 is a plan view of the upper end of the chute as shown in FIG. 10.

FIG. 12 is a sectional view on the line XII—XII of FIG. 10.

FIG. 13 shows one form of grab suitable for lowering down the chute.

Figure 1:
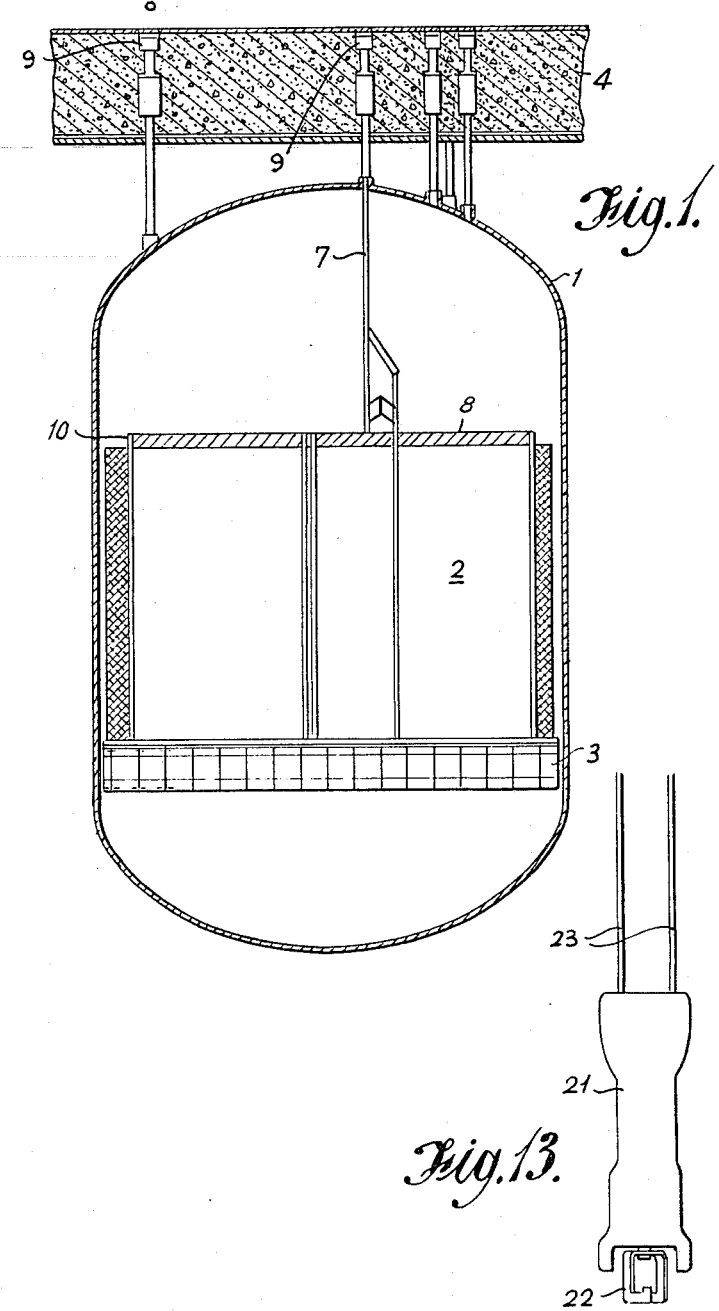
FIG. 1 is a vertical sectional view showing the general arrangement of a solid, e.g. graphite, moderated reactor embodying the invention.
Figure 2:
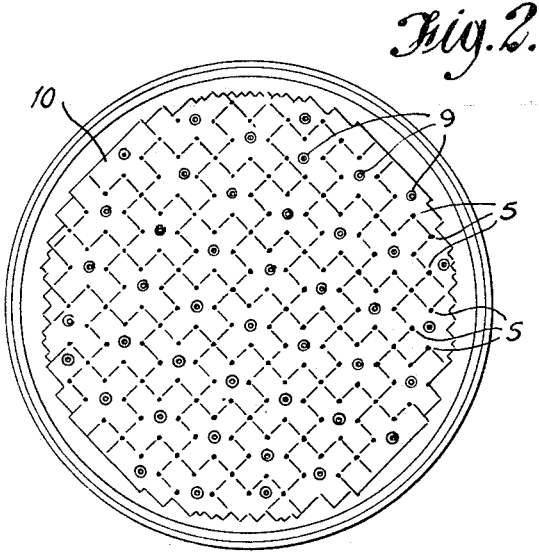
FIG. 2 is a plan view of the loading top face of reactor core.

In FIG. 1 the reference 1 indicates the wall of the pressure vessel and 2 is a graphite reactor core supported on a suitable supporting structure 3. Above the pressure vessel 1 is a concrete charging floor 4 which is sufficiently thick to form a biological shield. The reactor is provided with a number of control rods which extend downwardly from the charging floor into vertical passages in the core. In plan view these control rods 5 are arranged in a rectangular matrix uniformly spaced apart in both directions as shown in FIGS. 2 and 3.

Figure 3:
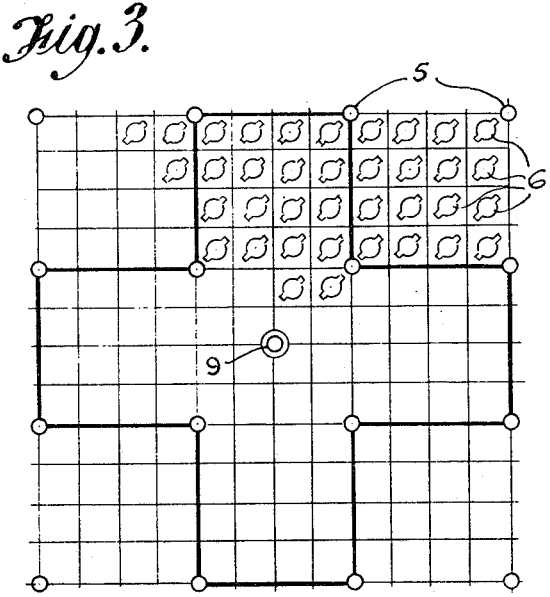
FIG. 3 is a detailed section to an enlarged section of a section of the loading top face of reactor core.

As shown in FIG. 3 the fuel passages 6 are also arranged in a rectangular matrix but with a smaller spacing and a number of fuel passages are located in each square area formed by a set of four control rods.

The invention is concerned with loading and unloading the fuel elements into and out of the fuel passages 6 in such a manner that the charging apparatus does not foul the control rods 5. This is achieved in accordance with the invention by passing the fuel elements down chutes 7, each of which operates over an area on the top face of the core which is of a cruciform shape in plan. Thus, as shown in FIG. 2, the top surface of the core is, for charging purposes, divided up into a number of cruciform operating areas and a charging passage 9, into which a chute 7 can be inserted, is located over the centre of each cruciform area. It will be observed from FIG. 3 that the cruciform areas are so arranged that the arms extend outwardly from the centres each of which is directly below one of the charging passages 9.

As appears more clearly in FIG. 1 the graphite core 2 is formed with a top retaining plate 10 and in referring to the top surface 8 of the core it is actually the surface of the retaining plate to which reference is made.

Figure 4:
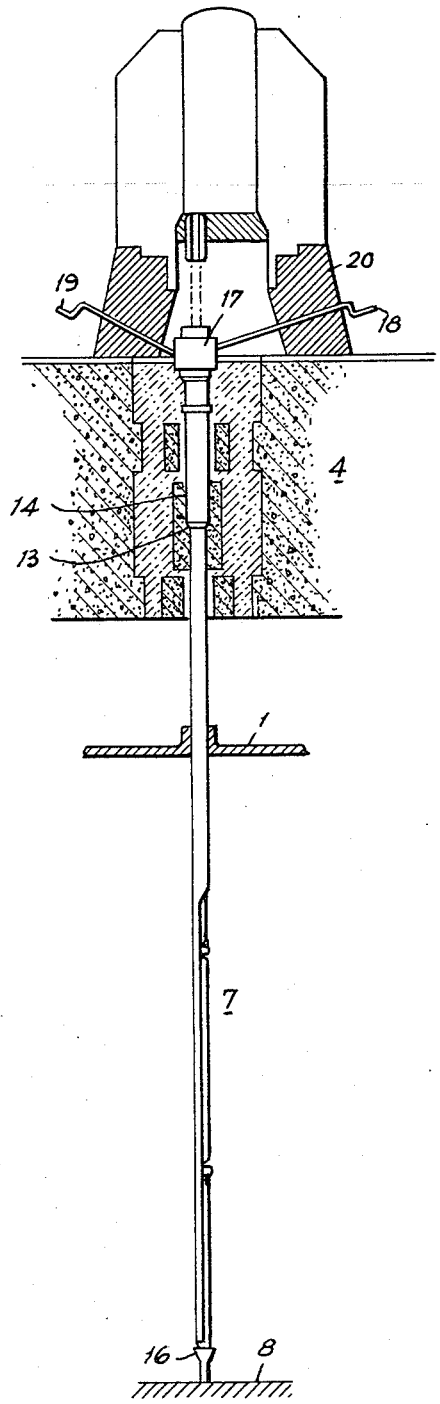
FIG. 4 is an elevation of the charging chute in the collapsed position.
Figure 5:
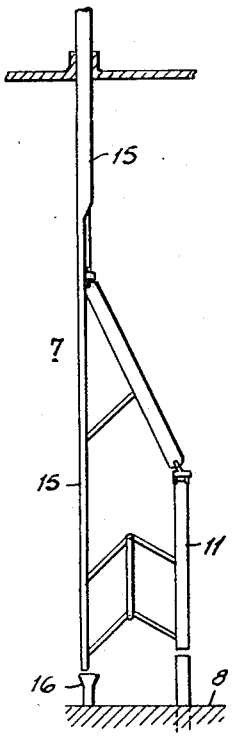
FIG. 5 is a corresponding view showing the lower end of the chute when displaced radially.

Referring now to FIGS. 4 and 5, charging and discharging is effected by inserting a charging chute 7 in the appropriate charging passage and displacing the lower end 11 radially outwards in the appropriate direction. In this way it is possible to operate on any of the fuel passages within a cruciform area, as indicated by the line in FIG. 3, when the charging chute has been inserted. By dividing the core into a number of such areas it is possible to load any of the fuel passages by means of a relatively small number of charging passages 9. Thus, as appears from FIG. 3, each charging passage 9 can serve for the loading and unloading of 80 fuel passages.

When it is desired to effect charging or discharging a cover plate in the charging floor would be removed and over this would be placed mechanism for inserting a charging chute into the charging passage. This must, of course, be such as to maintain adequate shielding and suitable mechanism for effecting this is described in co-pending U.S. Patent Application Serial No. 716,121 of Sutherland et al. The charging chute is lowered down a charging passage and in the arrangement shown the weight is taken by a shoulder 13 in an outer fixed sleeve 14. The charging chute extends through the pressure jacket 1 and comprises an outer tube 15 which is rotatable and the lower end of which rests in a location spigot 16 in the top retaining plate of the core. The outer sleeve 15 is rotatable and a suitable bearing would be located at the lower end so that it can rotate on the spigot 16. The outer tube 15 is provided with a vertical slot to permit outward displacement of the lower end 11 of the inner tube and the outer tube 15 is rotatable so that the position of the vertical slot can be adjusted to the required angular positioning depending upon the direction in which it is desired to displace the lower end 11 of the inner tube. The control of these movements would be effected through suitable mechanism at 17 operated by controls indicated diagrammatically at 18 and 19 respectively. These controls would be used in a cover shield 20 which is placed over the top end of the chute.

It is intended that the actual loading and unloading would be effected by a grab which is lowered down through the charging chute and supports a fuel element at its lower end. Such a grab is shown diagrammatically in FIG. 13. It comprises a body 21 having adjustable jaws 22 at the lower end which engage the fuel elements or preferably a supporting housing for the fuel element and is suspended by a pair of cables 23. Such mechanism is described in greater detail in co-pending U.S. patent application Serial No. 716,233 of Sutherland et al. In such apparatus the housing for the fuel element slides along guides in the fuel channels in the reactor and consequently when loading it is necessary to ensure that the fuel element is correctly oriented so that the carriage will engage the guide grooves when it enters the top of the reactor. It is consequently necessary to provide the chute with corresponding guides and in order to ensure that these shall line up with the guides in the fuel channels of the core it is necessary to operate the device in such a way that the inner tube of the chute is not rotated.

In the case of a gas moderated reactor it will also be necessary to effect a degree of shielding at the top of the charging chute when loading and unloading to prevent escape of gas which may be radioactive.

The chute is shown in greater detail in FIGS. 6–9 and referring first to FIG. 6 it will be observed that it comprises an upper tube 24 which does not rotate and is coupled through a universal joint 25 to the upper end of a connecting piece 26 of the lower end of which is connected through another universal joint 27 to the upper end of the lower displaceable section 28 of the inner tube. The universal joints 25 and 27 may conveniently be made to some extent gas tight by suitable known constructions. The lower end 28 of the inner tube is coupled to the outer tube 15 by means of a parallel linkage 16 which is connected to the tube 28 through rotating joints 29 and 30. Thus, when the inner tube is collapsed, i.e. in the position of FIG. 4, the outer tube 15 can be rotated around the inner tube into the correct angular position without displacing the inner tube by virtue of the joints 29 and 30. When the outer tube has been correctly positioned angularly the lower end of the inner tube can then be displaced radially through the vertical slot 31 in the outer tube 15. The mechanism for adjusting the lower end of the inner tube radially comprises a carriage 32 (FIGS. 7A and 7B) which slides vertically along the interior of the outer sleeve 15. This carriage is provided with a laterally projecting pin 33. Pivoted on the pin 33 is a link 35, the further end of which is coupled to the connecting tube 26 through a rotating joint 37, the purpose of the rotating joint 37 being to permit rotation of the sleeve 15 about the inner tube, as explained in connection with the rotating joints 29 and 30. It will be observed that raising or lowering the carriage 32 controls the angular positioning of the link 35 and hence the radial displacement of the inner tube 28 with respect to the axis of the outer tube 15. The actual control of the carriage is effected through a rod 38 extending downwardly from the thrust race 39 and connected to the end of a lever 40 pivoted at 41 on the carriage 32. Actually there are two rods and levers but only one appears in the drawing.

FIG. 7A shows the positioning of the parts when the inner sleeve is collapsed, i.e. when it is located within the outer sleeve, as shown in FIG. 4. Lifting of the rod 38 will now rotate the arm 40 until the nose 42 abuts against the lower extended end 43 of the link 35. This will rotate the link 35 in a clockwise direction about its pivot 33 and displace it from its vertical position until the nose 42 of the lever 40 abuts against the stop 44 in a position shown in FIG. 7B. When this happens further rotation of the lever 40 about the pin 41 is prevented and further lifting of the rod 38 will serve to raise the carriage bodily and in so doing rotate the link 35 to a greater extent, e.g.; into the position shown in chain dotted lines in FIG. 7B and the amount of the lift will control the outward displacement of the inner tube section 28. Slot 34 in the outer tube 15 permits the lower extended end 43 of link 35 to pass through the outer tube 15 during rotation about pivot 33. It will be appreciated that in this way the lower end of the inner tube section 28 is adjusted both angularly and radially about the axis of the outer tube 15 into the required position depending upon the fuel channel it is to load or unload. It will be appreciated that the loading chute will be inserted in the collapsed position, i.e. as shown in FIG. 4, and that the sleeve 15 must first be rotated into the correct angular position as this can only be done when the inner tube is collapsed.

This is performed by means of the internal gear 61 shown in FIG. 10 which is cut in the top of the inner tube 15. This gear 61 is engaged by a pinion 62 mounted on the end of shaft 63 which extends from the operating coupling 64 on the top of the chute, shown in FIG. 11. When this adjustment has been made the inner tube can then be displaced radially.

FIGS. 8 and 9 are enlarged views showing the universal joint 27 in greater detail. This is of a usual construction and comprises a ring 45 connected to the tube 26 through trunnion arms 46 and to the tube 28 through trunnion arms 47 which are at right angles to the trunnion arms 46. As above mentioned, it is necessary to provide guides for the fuel carrier when passing down the chute and these guides are indicated at 48 in FIG. 9.

FIGS. 10, 11 and 12 show the construction of the upper part of the chute and it will be observed that there are a pair of arms 38, the upper ends of which are pivotally connected to an outer annulus 49 which is mounted on an inner annulus 50 by means of a thrust bearing 51. This thrust bearing 51 is in turn carried on the lower ends of lifting rods 52. It will be appreciated that operating rods 38 will rotate with the outer tube 15 whereas the lifting rods 52 will not rotate and thus relative movement is permitted by the thrust bearing 50. This whole unit comprises the thrust bearing 39 in FIG. 6. The lifting rods 52 pass up within the upper part 53 of the inner sleeve and relative movement of the outer sleeve 15 about the inner sleeve is permitted by roller races 54 which may be suitably positioned, the weight of the outer tube 15 being taken by the thrust bearing 65. The chute extends up through a fixed tubular ducting 55 and FIG. 11 shows the upper face of the duct in which it will be seen that the lifting rods 52 terminate at their upper ends in racks 56 which engage pinion wheels 57. These are mounted on shafts 58 and may be operated by drives engaging couplings 59 and carried within the cover plate assembly 20 (FIG. 4), the vertical drives operating the couplings 59 driving the horizontal shafts 58 through bevel gearing 60.

What we claim is:

1. For a nuclear reactor having a solid moderator core with vertical passages adapted to contain fuel elements, surfaces of said passages adapted to engage with said fuel elements so as to orientate all the fuel elements in the same direction within said vertical passages, a fuel charging floor above said core and a plurality of ducts forming charging passages extending vertically downwards from said charging floor, a fuel element charging chute adapted to be lowered through said charging passages and comprising an inner tubular member, internal surfaces of said inner tubular member defining a channel along which said fuel elements may be passed, said internal surfaces being adapted to engage with said fuel elements so that said fuel elements are all orientated in the same direction within said inner tubular member and within said vertical passages within said core, an outer tubular member extending around said inner member, a fixed upper portion to said inner member, a horizontally displaceable lower portion to said inner member pivotally attached to said upper portion, edges of the wall of said outer member defining a vertically extending slots through which said lower portion may be displaced, means for rotating said outer member about said inner member so as to vary the angular position of said slot and hence the radial direction in which said lower portion may be displaced, a parallel linkage extending between said lower portion and said outer tubular member so that the axis of said lower portion remains substantially parallel to the axis of said outer member, and means for horizontally displacing said lower portion so that it may be aligned with any of the fuel element passages.

2. For a nuclear reactor having a solid moderator core with vertical passages adapted to contain fuel elements and control rods in separate passages, surfaces of said passages adapted to engage with said fuel elements so as to orientate all said fuel elements in the same direction within said vertical passages, a fuel charging floor above said core and a plurality of ducts forming charging passages extending downwards from said charging floor, said charging passages being located at the centers of unit plan areas of substantially cruciform outline, said areas having control rods located at each external and internal corner but no control rods within the associated area, a fuel element charging chute adapted to be lowered through said charging passages and comprising an inner tubular member, internal surfaces of said inner tubular member defining a channel along which said fuel elements may be passed, said internal surfaces being adapted to engage with said fuel elements so that said fuel elements are all orientated in the same direction within said inner tubular member and within said vertical passages within said core, an outer tubular member extending around said inner member, a fixed upper portion to said inner member, a horizontally displaceable lower portion to said inner member pivotally attached to said upper portion, edges of the wall of said outer member defining a vertically extending slot through which said lower portion may be displaced, means for rotating said outer member about said inner member so as to vary the angular position of said slot and hence the radial direction in which said lower portion may be displaced, a parallel linkage extending between said lower portion and said outer tubular member so that the axis of said lower portion remains substantially parallel to the axis of said outer member, and means for horizontally displacing said lower portion so that it may be aligned with any of the fuel element passages of the area associated with the charging passage through which the charging chute is passed.

References Cited in the file of this patent

UNITED STATES PATENTS

| | | |
|---|---|---|
| 2,756,858 | Kasschau | July 31, 1956 |
| 2,782,158 | Wheeler | Feb. 19, 1957 |
| 2,863,815 | Moore et al. | Dec. 9, 1958 |
| 2,930,744 | Shillito et al. | Mar. 29, 1960 |